Figure 1:
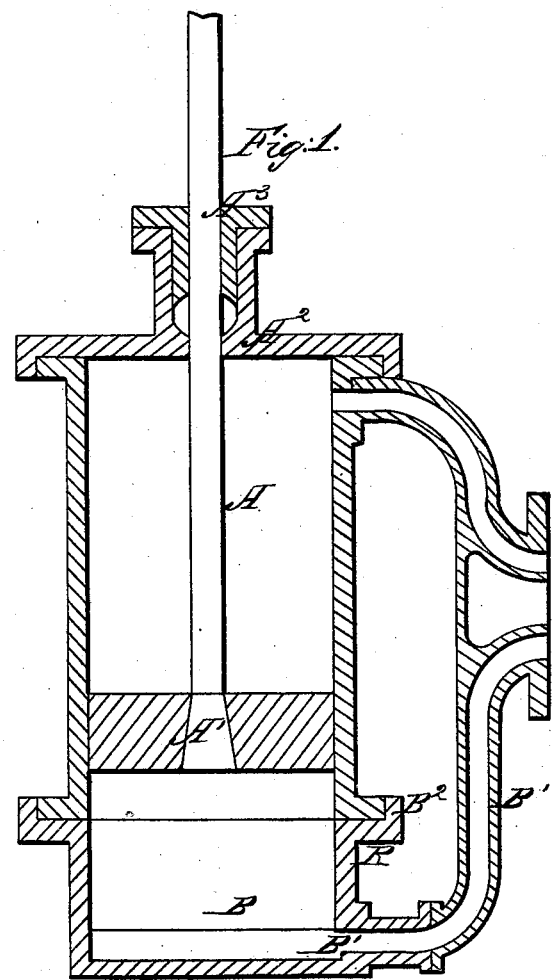

J. Lawson.
Steam Cylinder.
Nº 85,940. Patented Jan. 19, 1869.

Witnesses:
A. S. Nicholson
Percival Beckett

Inventor:
Joah Lawson

JOAH LAWSON, OF ALLEGHENY CITY, PENNSYLVANIA.

Letters Patent No. 85,940, dated January 19, 1869.

IMPROVEMENT IN STEAM-CYLINDERS.

The Schedule referred to in these Letters Patent and making part of the same.

*To all whom it may concern:*

Be it known that I, JOAH LAWSON, of Allegheny City, in the county of Allegheny, and State of Pennsylvania, have invented certain new and useful Improvements in Steam-Cylinder Heads; and I do hereby declare that the following is a full, clear, and exact description thereof, reference being had to the accompanying drawings, and to the letters of reference marked thereon, which form a part of this specification.

In the accompanying drawings—

Figure 1 is a vertical section of my improvement in cylinder-heads, as applied to an ordinary steam-cylinder.

Like letters of reference denote corresponding parts.

The nature of my invention consists in providing a suitable cylinder-head, with an annular extension, B, having a projecting flange, B², at right angles from the joint flange R, said projecting flange B² being bored out in a suitable manner to fit the flange of cylinder A.

The extension B is provided, in a suitable manner, with an induction-port, B¹, at or near the ordinary counter-bore or clearance S, which port B¹ corresponds and adjoins, in a suitable manner, the steam-passage B¹.

The extension B is bored out exactly the same diameter as the cylinder A, and is attached to the same by bolts, or such like devices, the whole so arranged, constructed, and put together that the piston A′, in its stroke, will travel both in the cylinder A and extension B, and the steam used for the back-stroke will flow from the induction-port B¹ of extension B.

As heretofore cylinders and cylinder-heads have been constructed, the induction-ports have been contained in the cylinder, at or near its mouths, and great difficulty has been found, after taking off the head and drawing out the piston, to adjust its packing, in replacing the piston, since, oftentimes, the packing gets into the steam-port, causing not only considerable manual labor to disengage the same, but also causing considerable injury to the packing-rings. This is often found the case, especially in steam-hammer pistons, the packing of which is generally of peculiar shape and construction, and also, especially in what is termed "steam-packing," which, being generally made in segments, is difficult to put in without closing up the ports beforehand with wood, or such like material, causing time and labor.

By the use of my devices, the piston A′ can be withdrawn, after taking off the head B, the packing adjusted, and the piston replaced without trouble. Since the steam or induction-port B¹ is contained in the cylinder-head B, there is no inlet or space the packing can catch in, and when the head B¹ is attached to the cylinder A, the whole being, as it were, solid, no trouble is found, thus saving expense, and unnecessary manual labor.

The devices herein described are applicable to either front or back heads.

Having thus described the nature, construction, advantage, and operation of my devices,

What I claim as new, and desire to secure by Letters Patent, is—

The annular extension-head B, with the flange B², induction-port B¹, in combination with the cylinder A and steam-passages, when constructed and arranged as herein described.

In testimony that I claim the foregoing as my own, I affix my signature, in presence of two witnesses.

JOAH LAWSON.

Witnesses:
A. S. NICHOLSON,
PERCEVAL BECKETT.